United States Patent
Fieldman (10) Patent No.: US 12,243,177 B1
(45) Date of Patent: Mar. 4, 2025

(54) SYSTEMS AND METHODS FOR USING ARTIFICIAL INTELLIGENCE WITH ASSISTIVE BOTS IN EXTENDED REALITY ENVIRONMENTS

(71) Applicant: VR-EDU, Inc., Gainesville, FL (US)

(72) Inventor: Ethan Fieldman, Gainesville, FL (US)

(73) Assignee: VR-EDU, Inc., Gainesville, FL (US)

( * ) Notice: Subject to any disclaimer, the term of this patent is extended or adjusted under 35 U.S.C. 154(b) by 0 days.

(21) Appl. No.: 18/461,392

(22) Filed: Sep. 5, 2023

(51) Int. Cl.
  *G06T 19/00* (2011.01)
  *G06T 13/40* (2011.01)
  *G10L 15/18* (2013.01)

(52) U.S. Cl.
  CPC ............ *G06T 19/006* (2013.01); *G06T 13/40* (2013.01); *G10L 15/1815* (2013.01)

(58) Field of Classification Search
  None
  See application file for complete search history.

(56) References Cited

U.S. PATENT DOCUMENTS

| | | |
|---|---|---|
| 9,369,410 B2 | 6/2016 | Capper et al. |
| 11,431,660 B1 | 8/2022 | Leeds et al. |

FOREIGN PATENT DOCUMENTS

| | | |
|---|---|---|
| CN | 108881319 A | 11/2018 |
| CN | 114327060 B | 1/2023 |

OTHER PUBLICATIONS

Nathie, "How to Get Hand Tracking on The Oculus Meta Quest 2", 2020, https://www.youtube.com/watch?v=hX7GJfYmj7M. (Year: 2020).*
Paradise Decay, "Oculus Quest Passthrough Camera & Guardian System in Action", https://www.youtube.com/watch?v=nQQJu1WV4_A, 2019. (Year: 2019).*
Kim et al., "Does a Digital Assistant Need a Body? The Influence of Visual Embodiment and Social Behavior on the perception of Intelligent Virtual Agents in AR", IEEE, 2018. (Year: 2018).*
Uchino et al., "VR Interaction in Real-Time between Avatar with Voice and Gesture Recognition System", IEEE, 2007 (Year: 2007).*
Topsakal et al., "Framework for a Foreign Language Teaching Software for Children Utilizing AR, Voicebots and ChatGPT (Large Language Models)", 2022 (Year: 2022).*
Dall-E/Dall-E2; retrieved on Sep. 28, 2023; 12 pages; https://openai.com/product/dall-e-2.
Janati, et al., "Adaptive e-Learning AI-Powered Chatbot based on Multimedia Indexing," IJACSA, vol. 11, No. 12, 2020, 10 pgs.
Nalbant, "The Importance of Artificial Intelligence in Education: A short review," JRSE-2106302112361, 15 pgs.
Huang, et al., "A Review on Artificial Intelligence in Education," Academic Journal of Interdisciplinary Studies, vol. 10, No. 3, May 2021, 12 pgs.
Chamola, et al., "Beyond Reality: The Pivotal Role of Generative AI in the Metaverse," arXiv:2308.06272v1, Jul. 28, 2023, 8 pgs.

* cited by examiner

*Primary Examiner* — Nicholas R Wilson
(74) *Attorney, Agent, or Firm* — Polsinelli PC (57) ABSTRACT

Assistive bots, such as computer-generated avatars that do not correspond to real world persons, provide automated instructional capabilities through the use of artificial intelligence to real world users seeking information in extended reality (XR) environments, like students learning in XR environments.

20 Claims, 4 Drawing Sheets

SYSTEMS AND METHODS FOR USING ARTIFICIAL INTELLIGENCE WITH ASSISTIVE BOTS IN EXTENDED REALITY ENVIRONMENTS

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields and in combination with artificial intelligence technology, in ways that are not possible in the physical constraints of the real-world.

In educational XR environments, it can be useful for students to interact with teachers, tutors, experts, study helpers, and the like, such as appearing with an avatar in the XR environment. While an avatar may correspond to a real-life person that is appearing in the XR environment to assist a student, it would be desirable to provide computer-generated avatars that operate through artificial intelligence, i.e., "assistive bots." An assistive bot can be considered similar to "non-player characters" (NPCs) that are well-known in video games, including XR video games. However, conventional NPCs do not actively evolve through artificial intelligence and machine learning to provide teaching, tutoring and educational assistance so as to be able to provide meaningful interaction and instruction to students an XR environments.

SUMMARY OF THE INVENTION

Embodiments of the invention provide an improved method and system for providing real world users in XR environments, including VR environments such as in the Oculus/Meta Quest platform by Oculus VR (Irvine, CA) (parent company Meta), with assistive bots, such as computer-generated avatars that are like conventional NPCs and do not correspond to real world persons, that provide evolving instructional capabilities through the use of artificial intelligence to real world students learning in the XR environment. It will be appreciated that the systems and methods, including related displays, user interfaces, controls, and functionalities, disclosed herein may be similarly implemented on other XR platforms with other XR SDKs and software development tools known to XR developers.

In embodiments of the invention, assistive bots in XR may have avatars that appear as human instructors, teachers, tutors, study helpers and the like. In other embodiments, assistive bots in XR may be represented by avatars of animals, imaginary creatures, and other living things. In other embodiments, assistive bots may be represented in XR with inanimate or animated objects, such as a book, tool or other virtual object that is capable of interacting with a student. In various embodiments, an assistive bot in XR can hear, speak, move, create and/or retrieve information, media, virtual objects and the like, and can make changes to the XR to assist the user or student.

In embodiments, the extended reality environment for the foregoing method is an augmented reality environment, virtual reality environment or a mixed reality environment.

DETAILED DESCRIPTION

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Corresponding reference characters indicate corresponding elements among the view of the drawings. The headings used in the figures do not limit the scope of the claims.

Computer-Implemented System

Figure 1:
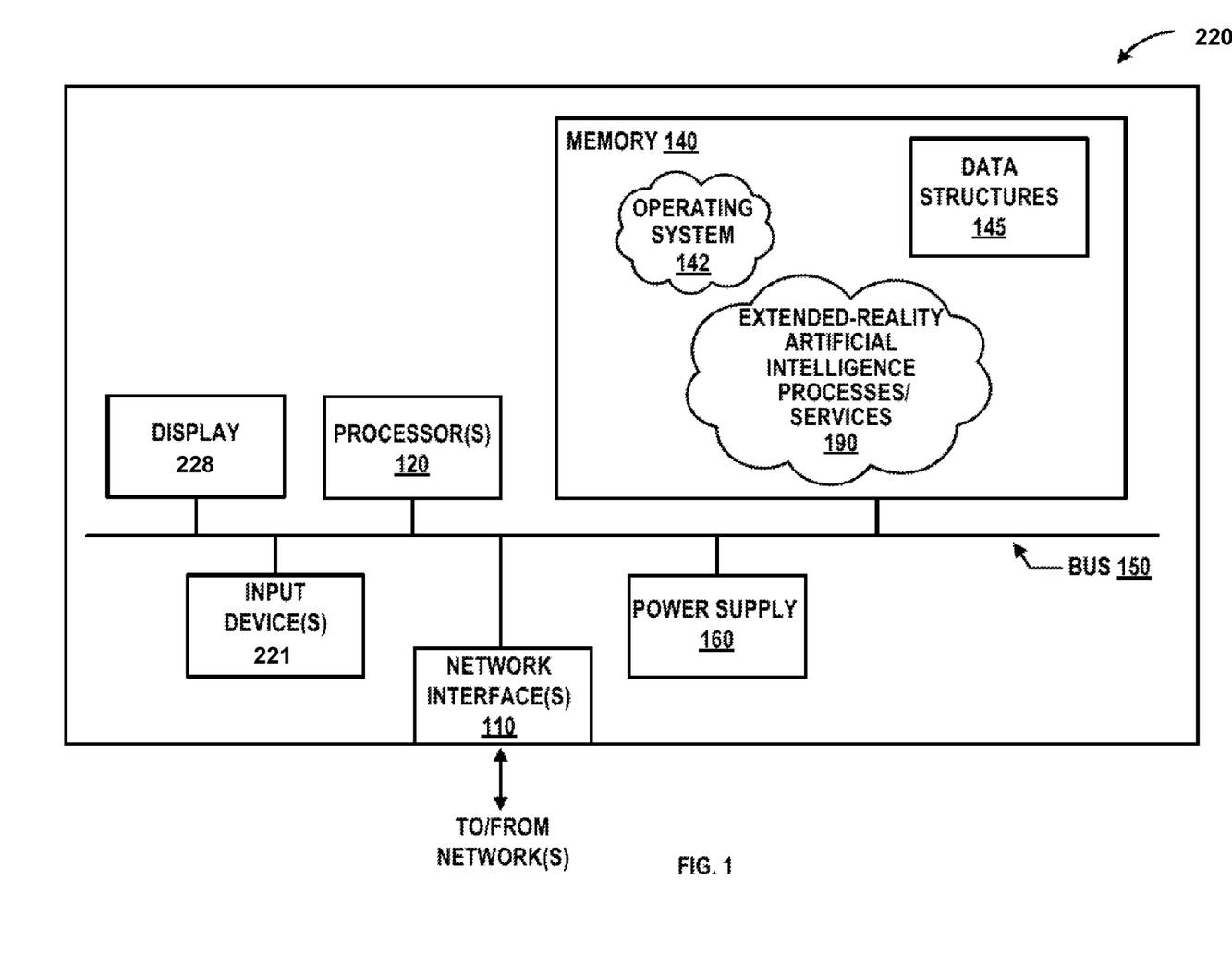
FIG. 1 is a schematic block diagram of an XR device in an embodiment of the invention.

FIG. 1 is a schematic block diagram of an example XR device 220, such as wearable XR headset, which may be used with one or more embodiments described herein.

XR device 220 comprises one or more network interfaces 110 (e.g., wired, wireless, PLC, etc.), at least one processor 120, and a memory 140 interconnected by a system bus 150, as well as a power supply 160 (e.g., battery, plug-in adapter, solar power, etc.). XR device 220 can further include a display 228 for display of the XR learning environment, where display 228 can include a virtual reality display of a VR headset. Further, XR device 220 can include input device(s) 221, which can include audio input devices and orientation/inertial measurement devices. For tracking of body parts, such as hands, faces, arms and legs, held physical objects, and the like, input devices include cameras (such as integrated with an XR headset device or external cameras) and/or wearable movement tracking electronic devices, such as electronic gloves, electronic straps and bands, and other electronic wearables. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device 220 and need not be self-contained on the XR device 220.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, XR device 220 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and the methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes XR device 220 by, inter alia, invoking operations in support of software processes and/or services executing on the device. These software processes and/or services may include Extended Reality (XR) artificial intelligence processes/services 190, which can include methods and/or implementations of standalone processes and/or modules providing functionality described herein. While XR artificial intelligence (AI) processes/services 190 are illustrated in centralized memory 140, alternative embodiments provide for the processes/services to be operated as programmed software within the network interfaces 110, such as a component of a MAC layer, and/or as part of a distributed computing network environment. It will be appreciated that AI processes include the combination of sets of data with processing algorithms enable the AI process to learn from patterns and features in the data being analyzed, problem being solved, or answer being retrieved. Preferably each time an AI process processes data, it tests and measures its own performance and develops additional expertise for the requested task.

In various embodiments AI processes/services 190 may create requested digital object images via image generating AI system, such as Dall-E or Dall-E 2 (see https://openai.com/product/dall-e-2 incorporated herein by preference) or other similar image generation systems and other synthetic media. In other embodiments, an AI process/service 190 might retrieve a requested digital object image from one or more local databases, centralized databases, cloud-based databases such as Internet databases, or decentralized databases. Some further examples of connected AI processes may include ChatGPT™ by OpenAI™ and Wolfram™ tools for AI and the like that the XR system of the invention can use for text and speech-based outputs.

Figure 2:
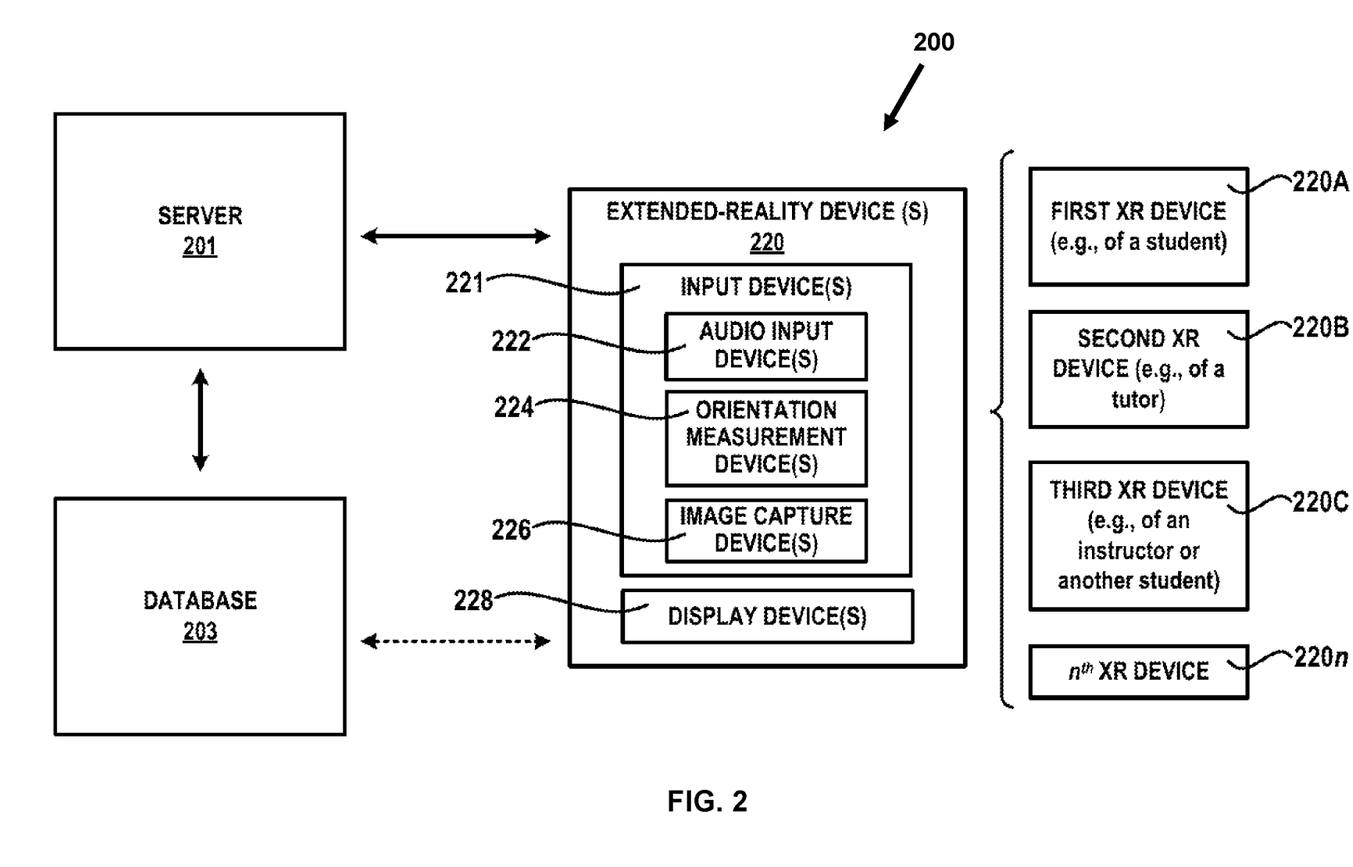
FIG. 2 is a block diagram of an XR system platform in an embodiment of the invention.

Referring to FIG. 2, an XR system (hereinafter, "system 200") for implementation of the XR learning environment, including an XR server 201 accessible by a plurality of XR devices 220 (e.g., a first XR device 220A of a first user such as a student, a second XR device 220B of a second user such as a tutor, a third XR device 220C of a third user such as an instructor . . . an nth XR device 220n belonging to another user, etc.) and another suitable computing devices with which a user can participate in the XR learning environment. The system includes a database 203 communicatively coupled to the XR server 201.

XR devices 220 includes components as input devices 221, such as audio input devices 222, orientation measurement devices 224, image capture devices 226 and XR display devices 228, such as headset display devices.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

Assistive Bots

A computer-assisted system such as described is programmed to generate an assistive bot, such as a computer-generated avatar of an instructor, tutor, study helper, and the like, that is somewhat like conventional NPCs in not corresponding to a real-world person, that provides evolving instructional capabilities through the use of artificial intelligence to real world students learning in the XR environment of the system. In some embodiments of the invention, assistive bots in XR may have human-like avatars in appearing as human instructors, teachers, tutors, study helpers and the like. In other embodiments, assistive bots in XR may be represented by avatars of animals, imaginary creatures, and other living things. In other embodiments, assistive bots may be represented in XR with inanimate or animated objects, such as a book, tool or other virtual object that is capable of interacting with a student. In various embodiments, an assistive bot in XR can hear, speak, move, create and/or retrieve information, media, virtual objects and the like, and can make changes to the XR environment to assist the user or student.

An assistive bot provides instruction based on the artificial intelligence processes/services 190 ("AI service"), such as the bot being connected to software programmed with Large Language Model (LLM) technologies like ChatGPT™, created by OpenAI OpCo, LLC, San Francisco, CA, whereby the artificial intelligence processes/service 190 cause the assistive bot to continually evolve in providing appropriate and efficient instruction based on the student in the XR environment that interacts with the assistive bot. In some cases, an assistive bot may be assigned to a particular student so as to evolve in instructional capabilities and style with the characteristics and needs of that student. It will be appreciated that advantages of an AI-driven assistive bot that is computer-generated vs. a real human in XR includes: reducing the need and time for real world persons to appear as instructors in XR environments, always-on availability to a student, having the ability to quickly and electronically obtain information and knowledge directed to a particular subject matter or tasks that might be beyond the capabilities of real world persons, having ability to interact with and learn from other assistive bots without the presence of real world persons in the XR environments, having limitless capabilities to manipulate an XR environment as an electronic tool and component of the computer-generated system (i.e., a real world instructor would be expected to have far less technical skill and knowledge of all of the capabilities of the computer-implemented XR system 200 compared to the assistive bot that is programmed with superior capabilities to retrieve information and change/operate the XR environment for optimal instruction), and numerous others advantages.

Assistive Bot Processing Context of Requests and Providing Appropriate Responses Where an assistive bot interacts with a student in XR, it is preferable that an assistive bot processes the context of requests from, and words used by, the student seeking help. It is also preferable that the assistive bot understand who or what such bot is, such as the "backstory" of the bot. For example, an assistive bot might be a computer-generated astronomer that helps students. In one embodiment, a student might ask the astronomer bot for information about "Venus," such as by speaking the request including such word in the XR environment, and such request is detected from the user's microphone and processed by the AI service of the system of the invention. The AI service is provided data from the system that reflects that the bot is an astronomer. That data may be provided from a database of the system, and it will be appreciate that the database will store similar respective context data for other assistive bots, XR users, XR objects, XR locations, study subject matter, XR classroom information, and any other aspects of the XR system capable of interaction with assistive bots and XR users. By retrieving context data that the student is interacting with an astronomer bot, the AI service can interpret words and requests from student users that might otherwise be ambiguous to a bot that is merely pre-programmed with limited response capabilities like a video game NPC. An AI-powered assistive bot in the foregoing example will assume that "Venus" is not referring to a mythological goddess but is likely referring to the planet. Accordingly, information and assistance provided by the astronomer assistive bot is based on the known backstory, i.e., context data, of the computer bot as an astronomer being retrieved by the AI service so that that information and answers provided by the assistive bot to the student user relate to astronomy, space and the like, and not to mythology. It will be appreciated that context data is highly useful for processing inputs from student users that might otherwise be ambiguous and allows the system to provide better and more relevant results through assistive bots in the XR educational environment.

In further embodiments, an assistive bot also processes the characteristics of the student user that is interacting with so that the bot provides responses that are context relevant to the user, such as accounting for age, grade, subject matter, language, and the like. For example, an AI service of the invention may be programmed with subject matter information for different educational levels. Taking the astronomer bot example with a student user request for information relating to "Venus," the AI service might determine the student user is a middle school student and therefore limit responses based on a middle school textbook or similar middle-school level information that a middle school student would be expected to understand more appropriately than a small child or a PhD-level astronomy student. However, if the user is determined to be a small child, then the AI service may cause the assistive bot to provide a response from an elementary school textbook. If a PHD student is determined as the user, then the most complex information source may be used by the AI service to provide a response.

Generally, the AI-service is programmed to retrieve characteristics' data about the student user and then can retrieve information from the corresponding data set or source that is matched to one or more of the characteristics' data about that student user.

As an example of using multiple characteristics' data of a student user, the AI-service through the assistive bot might also determine that the student user is speaking French and will, together with the user's educational level data, determine a corresponding French astronomy information source for the user's grade level to provide a response to the user in French and at the appropriate education level. In other embodiments, the AI service might use an information source to a corresponding level in any language and then translate the response for the assistive bot to provide to the user into the user's detected language.

Another embodiment of the invention is a system that can detect objects, tools, and interfaces that student users are using in a particular XR location near an assistive bot to provide context to the assistive bot to determine a response to a request. The AI service might, for example, detect that students users have VR study tablets open to astronomy in a classroom of an XR environment and, like the examples above, resolve any ambiguous requests to subject matter most closely related to astronomy.

In another example, a user might be using or looking at a space-related object, and when the student says the word 'Mercury' to an assistive bot, the system can process the word as relating to the planet Mercury, and not mythology, nor the element in Chemistry, nor a type of car, nor a record label, etc., In another embodiment, text or handwriting in a VR room or a user reading a file or text on an information board can provide context data for an assistive bot to determine responses. A detected text of chemical formulae by an AI service at an XR room of student user saying "Mercury" would indicate that the user is referring to the chemical "Mercury" to resolve ambiguity for a response to be provided from an assistive bot.

In other embodiments, objects at a XR location, such as a VR classroom, may be detected by the AI service to resolve ambiguities and provide a better assistive bot response. A user might say "Mercury," and even if an object or text for the planet Mercury is not in the room, the AI service might detect object models for Earth, Venus and Neptune, and the AI would process the response from the assistive bot as pertaining to the planet Mercury and astronomy. Accordingly, related objects or combinations of objects (and even objects combined with detected text) can provide context for optimizing responses from AI-driven assistive bots.

In some embodiments, backstories and/or related data set(s) can be assigned to a digital object in XR, whether an object that is asked about by a user seeing the object in the XR location or an object that might be generated or retried to display to a user in a response from the AI service and an assistive bot. As an example, if a user touches "mercury" on a periodic tablet vs. touching "mercury" planet model or image in XR, that object and context information should be clear enough so that the AI service knows what a request is relating to. Further, depending on the object, the system could make changes to an assistive bot, such as changing to a different avatar and corresponding data set (e.g., changing to astronaut if user touches planet mercury) and/or change the environment (e.g., add other related objects, play instructive media such as audio and/or video clips, and the like).

In an embodiment, objects with a relative distance to a user can help provide context data for an assistive bot to determine what a user is requesting. A user might say to an assistive bot in XR, "Can you tell me about this?" (or 'what is that?' or 'what am I holding?' or 'how do I use this?' Or 'what is that thing over there?'). An assistive bot can be programmed to determine what "this" means to provide a response to the user as described in the following steps:

(0) if there is only one object (or 'tool' (like a Table Saw) or piece of whatever XR content) spawned in the room, then the assistive bot will assume that the one object must be "this" and use that object's information for the AI service to process the query. The remaining steps are not necessary in this scenario. However, if there's more than one object/tool/whatever in the XR location and there is an ambiguity (these steps are not applied where the user specifies an object audibly), then the steps include:

1) check if hand is green (over an object) or blue (grasping an object). Treat these green and blue hands equally. Also, make sure to check both hands. If both hands are green or blue, well then both objects go to the assistive bot in the 'prompt' to the AI service, telling it what exactly the human is asking about when the human says, 'this'.

2) If nothing in #1, then determine if user is pointing. If pointing at something (or each hand pointing), then select what is being pointed at.

2.5). If pointing at 2 things on the same line basically, select the closer object. Ignore the further object. Do this for each hand individually so it's the object closes to one hand and the object closet to the other hand (assuming both are pointing at something). If one hand is pointing at something close and behind the close object is a far object, and the other hand is pointing at no objects, then the system still selects the closer object for the first hand and nothing for second hand.

3) if nothing in #1 or #2, then the system uses eye tracking sensors on the XR device (if they exist, otherwise skip this step) to see what user is looking at. If looking at an object, then select the same. If one object is close and one object is behind it, only select the closer one. So only one object possible if users are in #3 step—Not 2 objects as a maximum like with a user grasping or pointing.

3.5) If device doesn't have eye tracking sensors, then just use 'gazing' using the head tracking sensors instead. If the user's head is pointing at an object (when the user says, 'can tell me about this?', select the same. If one object is close and one object is behind it, only select the closer one. So only one object is possible for selection if the user is in #3.5 step—Not 2 objects maximum like with a user grasping or pointing.

Important note: on 3.5 is that if there are eye tracking sensors on XR device (see item #3 above), and no object is in #1 or #2 or #3, then the system does not do #3.5. Example: If the headset sees a user's eyes looking at open space (no object), since eyes pointing to the user's right, that's where the user is looking. If the device's head tracking sensors also see that user gazing forward in the direction of an object, system preferably ignores that because the system has much better data: the eye tracking sensors. In this case, even though the user is facing with their head towards an object, the person is not actually *looking* at that object so the system ignores the fact that the user is facing the object.

So again, step/item #3 above only happens if device has eye tracking sensors . . . and 3.5 may get skipped—it gets skipped if device has eye tracking sensors, but those sensors don't detect the user looking at any object/tool/etc.

4) If nothing in 1/2/3/3.5, then select the most recently spawned object/content.

It is noted that: environments/backgrounds and avatars of humans and avatars of assistive bots do NOT count for this object identification/selection analysis. That is, such information about them will NOT be sent to the AI service as an 'object'. The system preferably will NOT send certain things to the AI service and will purposefully ignore them in education XR environments since it is more likely in the education context for users to point at objects for educational inquiries and not other users or backgrounds.

In some embodiments an XR location may be linked to other XR locations, such as subject classrooms, and these links might also be evaluated by the AI service determine if objects or text in those linked rooms help provide context for a request. In the foregoing example, the immediate occupied XR location where the student user spoke "Mercury" might not have helpful object data, but a linked location (such as links to one or more chemistry locations/rooms) might include objects and more data so that the AI service can process such linked location to determine proper context for providing a response to a request.

In some embodiments, an assistive bot may also retrieve and use data from past conversations with each student user to determine context of a current request. For example, an AI service might look back over 6 months of conversation between a student user and the assistive bot to determine the context and subject matter for providing parameters as to the appropriate response.

Prompting an Assistive Bot

When a user is in an XR environment, such as an XR room, with an assistive bot (e.g., computer-generated study partner avatar), it is preferable for the assistive bot to be programmed to detect when a user is attempting to interact with the assistive bot.

In one embodiment of the invention, if a user is alone with an assistive bot in a particular XR location, then a microphone on an XR device of the user can be set to a default setting for the microphone to always be on with the assumption that the user must be talking to the assistive bot if the user is speaking and no one else is present in XR. However, an on/off toggle control could able be provided for the user to turn the microphone off or on as desired.

In another embodiment, if there is more than a user and an assistive bot present in an XR location, there can be several methods for the user to unmute the microphone to talk to the assistive bot:

1. User maintaining eye contact with the assistive can trigger microphone and activate assistive bot readiness to respond to user requests 2. User could press and hold a microphone button on a physical controller 3. User could make a specific gesture detected by a camera of the XR device 4. User can be provided a virtual bot activation interface, such as a button appearing on the user's virtual wrist when they are near a particular assistive bot that they press and hold with their real finger at their real wrist to activate that nearby bot's responsiveness and the user's microphone. It will be appreciated that other virtual bot activation interfaces could be provided in other embodiments. In further embodiments, multiple VR buttons could be provided (such as on a wrist interface) for selecting among multiple assistive bots that are present in an XR environment, and a name, color, and/or other indicia of a respective bot can be displayed near a respective button for activating communications with that respective bot.

5. Eye-tracking with an XR device eye camera and be used to detect which assistive bot a student user is looking at and the system determines whether to turn on the user's microphone for that assistive bot. In some embodiments a specific assistive bot will light up or have other display characteristics confirming to the user that it is being looked at. It will be appreciated that a user's microphone can be turned on so that only a specific assistive bot(s) can access the user's microphone to detect the user's speaking requests and that they system can maintain the user's microphone as inaudible to other assistive bots and also to other users that might be at the XR location (such as other student user avatars being present). In some embodiments, a student user can use a blinking gesture or close eyes for a certain time to stop the activation prompt to a particular assistive bot. A user could also look away from the bot to stop communication and interaction; however, in one embodiment if the student user is still talking while looking away from the assistive bot, then the interaction/communication link would not be dropped and would continue.

In some embodiments a "Done" interface could be looked at by the student user, such as a button or sign with Done indicia looked at for at least a certain time period, that will drop the prompt to the assistive bot. In some embodiments, the indicia could have an animated "spin" that indicates that the prompt will be dropped when the spin around the "Done" indicia (e.g., circle) is completed at the end of the time period. In other embodiments, a user could also pinch or point at a "done" button or similar control input to drop the prompt.

6. A wake word or phrase could be used, such "hey Watson," to start the microphone for interacting with the assistive bot, and then the microphone and interaction would stop after a time period (e.g., some number of seconds) of quiet of the person in the XR environment who originally said, "hey Watson." In some embodiments a user could select specific wake words, wake names and the like. In further embodiments, users can select names for an assistive bot, including each user having their own respective name of any assistive bot that is personal to that user, and the user-selected bot name may be displayed near the assistive bot for the user to be reminded of the assigned name/wake word.

In embodiments of the invention, an assistive bot can light up, have a glow, or have such other display for that assistive both to indicate that is in "activation mode" and communicating with a user so that user knows that the bot is engaged in interaction with that user. In some instances, the display, light or glow of the assistive bot may also be seen by other users so that they know that the assistive bot is interacting with a user at such time. In addition, or instead of glowing, an assistive bot could provide other indications that it is activated for engaging with, such as putting hand around the bot's ear, or the bot gets bigger, or the bot steps towards the user, or the bot points at the user, or the pot audibly communicates "Yes" or "Ready", or a chime dings, or other visual/audio indicators.

In embodiments of the invention, an "end" word—like a wake word—can be used for a user to speak in the XR environment to confirm that the user is finished with a request and would like the assistive bot to provide a response or result. One example is for a user to say "over." When other persons are present at an XR location where a user is interacting with an assistive bot, it could be confusing or annoying for such other persons to hear "over." In some embodiments, the end word like "over" would not be heard by other users as the system could be programmed to mute the next speaking of "over" from the student user that follows the activation of the assistive bot. In such embodiments a slight delay, e.g., 0.25 seconds, can be provided between when the student user is speaking and when the audio is provided to the other persons in the XR location so that "over" (or such other words not intended for the other users) is muted when, detected during the slight delay while other audio is not affected.

Training Assistive Bots

In some embodiments, the instructional sources or data sets for assistive bots can be based on the instruction program, and style, of a specific tutor, teacher, or expert in particular subject matter. In some embodiments, an assistive bot in an XR environment can be programmed/instructed to "shadow" and obtain information (listening, reviewing files and lessons plans, etc.) from a designated instructor that is in the same XR environment. The assistive bot continually adds to the information source and data set for that particular instructor's instructional program.

Accordingly, the assistive bot can be programmed to detect when the specific instructor is teaching or tutoring and follows that instructor in the XR environment with that instructor's students, over a particular time period, and using what the instructors says to the students so that over time the data set for the instructor grows and the AI service can retrieve responses, information and answers from that instructor's data set for assistive bots.

In embodiments, the data sets of particular instructors can be separated by course type, grade level and the like so that if an instructor teaches different subjects that a respective data set can be used by the AI service to provide appropriate information though an assistive bot using the applicable data set for the desired instructor.

In other embodiments, an assistive bot can be trained by providing the AI service information from outside of the XR environment that a particular instructor might have used or being using. For example, an AI service might create a data set for Algebra 1 taught by Mrs. Smith and for Algebra 2 for Mrs. Smith based on videos that instructor Mrs. Smith has recorded in the past. In other embodiments, VR videos from XR environments might also be provided to the AI service to create or add to a data set(s) for Mrs. Smith's instructional programs.

In some embodiments, respective data sets for respective courses are created on course by course and state by state (or by country) basis to meet specific standards applicable to specific states.

In some embodiments, an assistive bot might obtain information for a data set from "listening" to study partners for a particular course or subject in the XR environment. One question that can arise is how an assistive bot should process and add data to the data set if the study partners are providing incorrect or partially correct information in their discussions. In some embodiments, the reliability of information sources can provide a hierarchy for what an assistive bot and the AI service will use for future requests. For example, the study partners might be assigned a "questionable" value as an information source. However, the main textbook for the course that the study partners are discussion might be assigned a "most reliable" value. The data in the data set from a textbook would therefore override or trump, i.e., be chosen by the AI service, as a more reliable source conflicting with lower reliability sources like the student study partners.

Assistive Bot Inquiries to Craft Responses

In some instances, assistive bots might not be able to process an ambiguous request or may have received insufficient information to process a request. In such embodiments, an assistive bot can inquire for more information and/or context data from the student user.

In one embodiment, an assistive bot might have a predetermined confidence threshold that needs to be reached to proceed with processing a question. This confidence threshold can be calculated based on different context parameters and programmed values for words, context data, and the like. If the confidence threshold is reached, then the assistive bot will attempt to provide a response, but if the threshold is not reached then the assistive bot can request more information from the student user.

For example, an assistive bot might audibly request or display a message in the XR environment to the student user after determining it has sufficient information for responding to a user's questions: "What class is this for?" After the student responds, the assistive bot will add that context data and attempt to provide a response after processing of the student user's request with the additional context data by the AI service.

If an assistive bot continues to have low confidence or insufficient information, it will audibly say or display in the XR environment "I'm not sure," or "Need More Info," so as to avoid just remaining silent without interaction with the student user or to avoid risks of providing incorrect answers or other insufficient response to the user's request.

In some embodiments an assistive bot can be provided in the XR environment in different states that determine when and how an assistive bot should interact with a student user.

In State 1, assistive bot is idle and doesn't listen for a student user's microphone unless a user activates the bot by "unmuting" the user's mic relative to the assistive bot and/or using a wake word and/or by looking at the bot and/or by pressing a button on a virtual tablet or similar interface interacting with an assistive bot.

In State 2, assistive bot is in an active listening/observer mode where it interacts only when it detects incorrect information.

In, State 3, assistive bot could be hidden, such as an invisible avatar, but the XR system 200 is programmed to audibly announce and/or have a pop up that displays to user "You might want to talk to your Study Buddy. Click here to pop up the Study Buddy." In such example "Study Buddy" is the name of the assistive bot. State 3 is similar to State #2 except that the assistive bot is not visible until it thinks it should be accessed. Hiding the assistive bot until needs helps reduce distractions to the student users.

Feedback to Assistive Bots

User feedback is important to training assistive bots so that positive feedback reinforces good answers or responses to requests and negative feedback reinforces avoiding incorrect or unhelpful answers.

For example, a student user might receive a response to a request and say to an assistive bot "Good Job!" and the same will be processed as positive feedback data and be linked to that request and response for providing a similar type of answer for future similar requests. Conversely, a student user might receive a response to a request and say to an assistive bot "That's Not Right" and the same will be processed as negative feedback data and be linked to that request and response for avoiding that answer for future similar requests.

In embodiments of the invention an assistive bot can be programmed to detect the feelings or sentiment of a user to assign feedback data or determine if a particular action is needed to assist the user. For example, a user's tone of voice might indicate frustration, sadness, or confidence that an assistive bot can user as sentiment data to determine an action or assign feedback to the interaction. One action might be for the assistive bot to provide encouragement when a user is detected as feeling frustrated, such as by audibly speaking "it's OK, you almost have it." Or the assistive bot might ask a user on detecting confusion "Do you understand?".

In some embodiments, an assistive bot is programmed to request feedback about a response from a user. The bot may complete a response and audibly ask or display "How was my answer?" or "Does that make sense?" and obtain subsequent feedback from the user and save such feedback data for learning and future answers.

In some instances, different users have different weight accorded their feedback. For example, a system of the invention can be programmed to provide higher weight of feedback from teacher vs. lower weight for feedback from a student. Similarly, a user with a higher level of education or course completion may have their feedback accorded higher weight in the feedback data vs. a user with a lower level of education or course completion.

Pairing an Assistive Bot to a User in XR

In one embodiment, users can be provided virtual tablets for a particular subject or course and each virtual tablet has an assistive bot that is assigned to that tablet and is available to help the user or a group of users using that tablet. Each respective assistive bot corresponding to a table may be programmed with a specific backstory and data set for teaching the subject matter, such as a lesson, associated with that virtual table.

In some embodiments, an assistive bot can be generated based on the particular subject matter and a type of profession or expertise being reflected in the assistive bot's backstory. For example, where astronomy or lessons about space are being taught, an assistive bot might be generated as an astronaut. In some cases, the assistive bot might be modeled after famous teachers, experts or other persons related to field, such as an Einstein-like assistive bot teaching physics, and the like.

In embodiments of the invention, a selection interface can be provided to a user for selecting the desired assistive bot for their needs. For example, a user might be interested in learning astronomy, and an assistive bot selection interface can present different assistive bots with different education levels and teaching styles for the student to choose what assistive bot will appear in the XR environment to assist that user—such as an astronomer with a PhD in astronomy, or an astronaut, or a 7th grade science teacher, and the like.

In some instances, a user (e.g., teaching user, student user, parent, etc.) might also be given a choice, such as through a selection interface or other input to the system, to choose among different education levels or data sets for an assistive bot to provide responses commensurate with the chosen education level, such as elementary school, middle school, high school, college, graduate level, and the like.

In one embodiment of the invention, a user might also have a choice or ability to provide guidance as to how detailed a response by an assistive bot should be. For example, a teacher of class in an XR environment could restrict all assistive bots associated with the class not to provide student users with the ultimate answers to questions or requests, but to limit responses to general guidance as to how one would go about finding or arriving at the answer and/or by providing similar activities (e.g. math problems) and assisting with working though that similar example problem, but not providing the answer itself to a question that might be in the user's homework or on a test.

In an embodiment, an assistive bot and AI service of the invention can process requests regarding 3D objects in the XR system 200. Example steps may include:

Step 1: Create 3D objects in XR environment.
Step 2: Create names for the 3D objects and/or tags.
Step 3: User selects one of the 3D objects in the XR environment
Step 4: The system sends the User's question AND the NAME or the TAG of the 3D object to the AI that the User is holding or pointing at. The system does NOT send the shape itself because AI can't read shapes (the system sends the NAME/TAG of the shape instead) but the user thinks that the system sent the shape to the AI.
Step 5: AI service interprets the user's question and the information (shape name, basically) that the system sent to AI. Multiple objects' information can be sent to AI in some embodiments. In further embodiments the system can send colors as well to the AI services.
Step 6: AI service processes the words and/or information received about the 3D object that is the subject of the query, and the AI service can render and responds with a shape to reflect the correct answer to show the user.

Identifying Virtual Materials that Users are Inquiring About

A common question from a student user to a teacher or tutor is: 'what is this?' and 'I don't know how to do this problem'. The student in an XR environment may not have sufficient information to fully describe the subject matter of their inquiry and may need to point, touch, reference, input (including keyboard and audible inputs), share materials or files and the like in order for such subject matter to be determined.

In embodiments of the invention, the XR system 200 uses a variety of different inputs to submit to AI processes and enable an assistive bot to provide assistance with student inquiries. As an example, a student can input 3D text into the XR platform to then send that to an AI process, such as chatGPT™ and Wolfram Alpha™ plugin, and an assistive bot can work to assist the student. It will be appreciated that conventional automatic tutors ("tutoring" bots) have limitations in that students have to type in math equations that are not readily input by keyboard and students can't type in a chemistry molecule or physics diagram, etc.

In embodiments of the invention, a student can type in 3D text or email math homework or share a file or share scanned/OCR text and the like with input boxes and output boxes in the XR environment. A student in one example could type with their fingers in the XR environment (such as in a 3D VR environment). In other embodiments, the XR platform can capture text or receive a file or capture information with camera-like a mobile phone handheld computing system or from an XR headset and scan their homework with such devices to a server that can share the scanned or photographed information to the XR platform.

The XR system in embodiments of the invention recognizes that when a user says "this," such as inquiry about "this" to an assistive bot, then the system will assess parameters that a correspond to what a user is doing, what virtual objects or materials are relevant by virtual proximity (either virtual distance closeness or recent subject matter that is determined to be most likely pertinent to the current inquiry). As an example, a student might say "this", and the system recognizes that the student is asking about a particular equation or problem or other item since that particular file or scan was recently uploaded or referenced by the user or might be pointed at by the user. If unclear, the assistive bot could ask questions to further understand what the student is asking. Or, if the assistive bot has a confidence value calculated for understanding what "this" is and what the student inquiry is, then the assistive bot can automatically recognize how to and what to provide as an answer—like solving a quadratic equation. In the noted example, the student pointing or virtually sharing a material or specific portions of material (like pointing to a problem, picture, graph or the like on a virtual page) together with the audio input of the inquiry "What is this?" or "How do I do this?" provides several information inputs or parameters for the XR system to determine what inquiry to process and what information to retrieve to process the inquiry.

In some embodiments, a student can point at portions of pages without specifically focusing on a single problem. In some embodiment, a Lidar scanner and/or camera from a smartphone computing device and the like can be used to input material for potential inquiries to the XR system. In other embodiments, 3D images/objects can be captured with scanning input devices, including from a smartphone. In some embodiments, unknown objects can be subject to 3D scan and could be processed through reverse image lookup (e.g., TinyEye™, Google Identify™, and the like) if they system doesn't already recognize though the system's internal lookup. Capturing of images, objects, scanned materials and the like to load to a server for possible inquiry submission in an XR platform can be either 2D or 3D or in other forms such as creating a storage file that can be processed by the XR platform.

Once the XR system determines identification of an object or other material, the system sends the identification to an AI process, like ChatGPT™, to retrieve more information about the object or other material. For example, a user might inquire to an assistive bot (or otherwise into the XR environment where questions are monitored), "Do bees pollinate this?" while pointing at daffodil flower image. The XR system recognizes the image as a daffodil and then adds "pollinate" (or possibly "bees pollinate") question about that object and can determine that the question is about the daffodil (even if image is not known at the start of question).

In further augmented reality environments this inquiry and AI processing can be done with "live" real physical objects in the augmented reality. A user could point to a real world object of a car engine, for example, such as when wearing augmented reality glasses or using a smartphone with an augmented reality application and camera, and then ask with reference to a specific piece of car equipment-"is this part hot" and the combination of looking and pointing and requesting audible information, the XR system, such as an augmented reality platform, determines what part the user is asking about and obtains the information about whether it is likely "hot" or not. In further examples, the user might request repair information or nearest mechanic to obtain additional information about fixing the part.

In further embodiments, identification of particular problems or subject matter from a file, such as a PDF page, can be identified when the user makers an inquiry. For example, an entire math textbook might be stored to a server and then a user might point to a PDF page from the textbook and the XR system recognizes the PDF page as from the particular textbook and know by optical recognition or page number and the like what subject matter is on the textbook page so as to understand what a student might be asking "this" about.

In another embodiment a student can scan or have a PDF file of a math problems page and could point to one of five problems separated by blank space ("answer space") so that the XR system recognizes that there are five individually separated problems and the closest problem is the one to be recognized and processed for answer or assistance to the user's inquiry.

To identify a problem, the XR system can look at the white space between the problems; alternatively, the user could specify the number of the problem, circle a problem, point at the problem, and the like. Through optical recognition and/or matching the problem page to a saved version of the same problem page on a server communicating with the XR system, the system can determine the specific problem with which a student is requesting assistance. In an embodiment, a student might also use voice inputs to specify a problem or subject matter that is the point of the inquiry and the XR system can use speech recognition to determine the substance of the inquiry from the voice-specified information.

In some embodiments, a student can use a headset camera in passthrough mode to provide passthrough images of their homework or subject matter material (book pages, printed materials, real world objects and the like) and the XR system could highlight around the target material and capture it into the XR system. In some embodiments, the AI processing by the system might connect directly to process the subject matter captured via passthrough; however, for security reasons many XR platforms do not permit passthrough of a user's environment, including real world educational materials, to capture images into an XR environment and platform. In such embodiments complying with security requirements, processing of passthrough images is instead performed locally. For example, an image might be taken, scanned, or photographed locally by a headset camera device (or a computing device with a camera like a smartphone in other embodiments) and the local image could be processed with text recognition or object recognition and then the local resulting text (following recognition) is sent to an AI process, like chatGPT™ OR Wolfram alpha™, from local communication with the XR or computing device. In another embodiment, a PDF image of only a particular page of material might be captured by the camera input device so as to avoid capturing any of the user's real-world environment and then that captured PDF image can be transmitted into the XR platform.

In some embodiments, software security controls-such as recognizing a sheet of homework apart from the rest of the real-world environment, can be implemented to preserve a user's real-world privacy while still being able to interact for educational assistance on particular real-world materials, like homework and textbook pages.

In one embodiment, a permitted paper, such as homework, can be recognized by an identifier that is recognized to allow that paper to passthrough an XR device camera without capturing any of the real-world environment. For example, a code, such as a QR code, alphanumeric code and the like can be coupled (such as a sticker, stamp and the like) or printed on the authorized paper that allows passthrough capture into the XR environment as the code is optically recognized by the camera and XR system processes. In some embodiments, location of the code on the paper, such as at one or more corners, can allow the XR system and camera to determine a photo angle to capture the sheet or page that is authorized to be brought into the XR environment. In other embodiments, voice commands and object recognition, such as recognizing the size of the page, the text and graphic layout of the page, and the like, can be implemented to permit homework or specific materials to passthrough into the XR system while blocking the environment. In a speech recognition example, a user can say "Let my Homework In" or point at real world object and the user can say "Let This In" and point at it. In some embodiments, an entire book or textbook and all of its pages might be made available as part of a user's files for accessibility by the XR system to provide assistance regarding that book. For example, a user can say "Get this Textbook" or "Get this Book" and the contents of the book will be retrieved and/or uploaded by the XR system for reference. In some examples, Canvas™, Blackboard™, Moodle™ and the like are communicatively coupled to the XR system to permit downloading of homework and other materials for use in the XR environment by input requests from users, including voice, text, and control input requests. Accordingly, the present invention presents a solution for permitting camera images of real world items to be brought into an XR environment while maintaining known passthrough blocking technologies relative to the rest of the real-world environment of the user.

In many instances, other real-world information besides paper, pages, books, and homework, may be needed for a user's use in an XR environment. For example, it might be necessary for a user to use passthrough mode on an XR headset to determine the distance of real-world walls or ceiling height, but without comprising privacy as to the user's real-world environment. In such embodiments, a camera measurement application, lidar, laser measurement hardware and software and the like can be used to measure distances and height around the user, but without capturing private details of the real-world environment.

In one embodiment of the invention, a user could use an interface in the XR environment, such as a virtual tablet with a "camera" or "scan" mode function, where the user can select a camera icon on the virtual tablet and then the XR environment assumes a camera mode where the student can look down at their paper, material or almost any real world object and then make a camera hand gesture (like pressing the button of a traditional point and shoot camera) and then the XR system 200 takes a picture of what the user sees and what the camera is pointing at to capture and transmit the image into the XR environment with that image able to be used by the user and AI processes and assistive bots and other users and the like. In some instances, the XR system will convert the image into a virtual representation of the material or object captured for use in the XR environment, such as text from the homework being changed to 3D text or to 2D text on an information board in the XR environment or a digital version of the object being replicated three-dimensionally in the XR environment (including being retrieved from identification by AI). In some cases, the XR system 200 presents the user with an interface or other prompt to select what virtual representation should appear in the XR environment as a reproduction of the object that was image-captured from camera mode.

Figure 3:
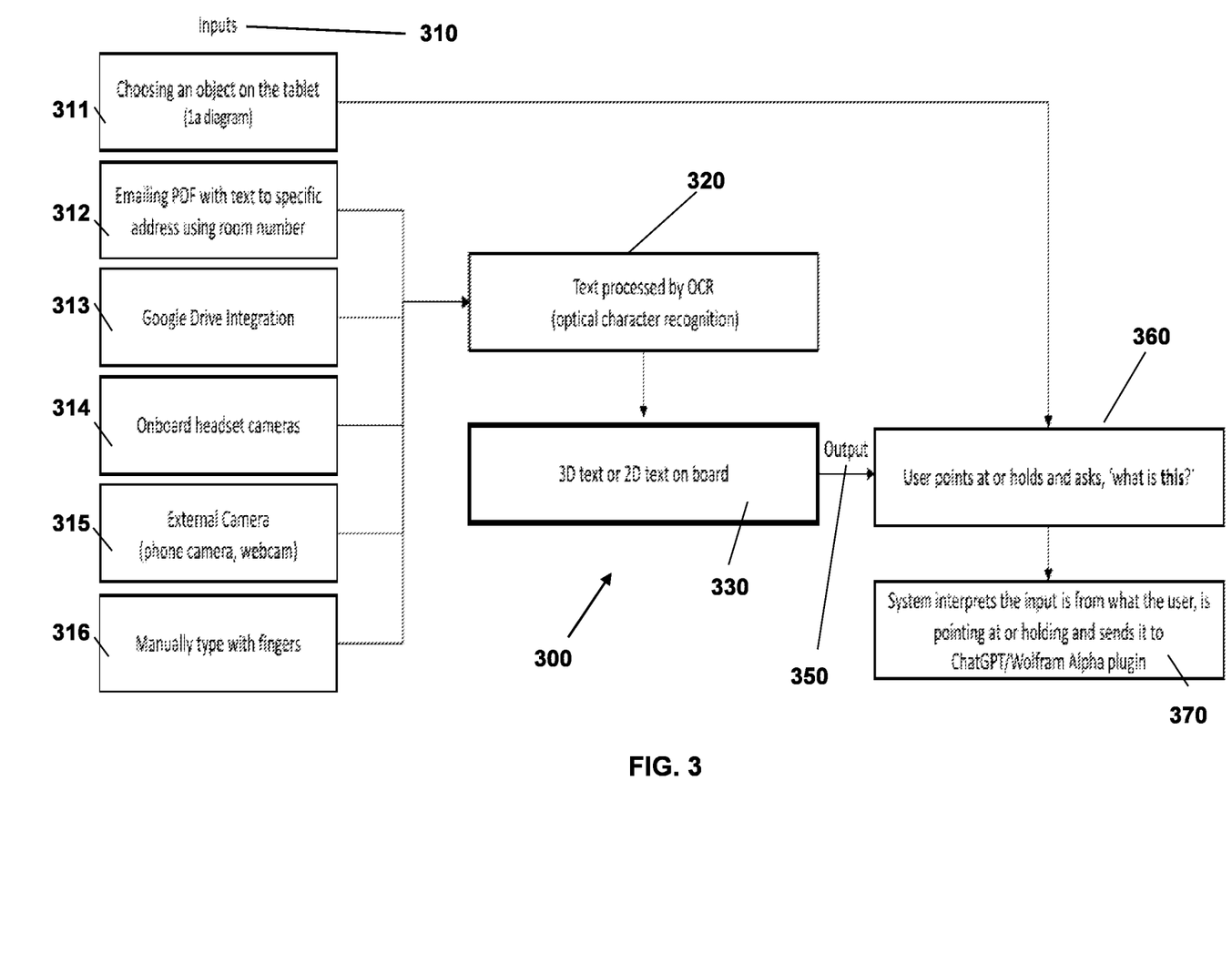
FIG. 3 is a relational diagram of processing of inputs to an XR system and retrieval of information using AI processes applied to the inputs in embodiments of the invention.
Figure 4:
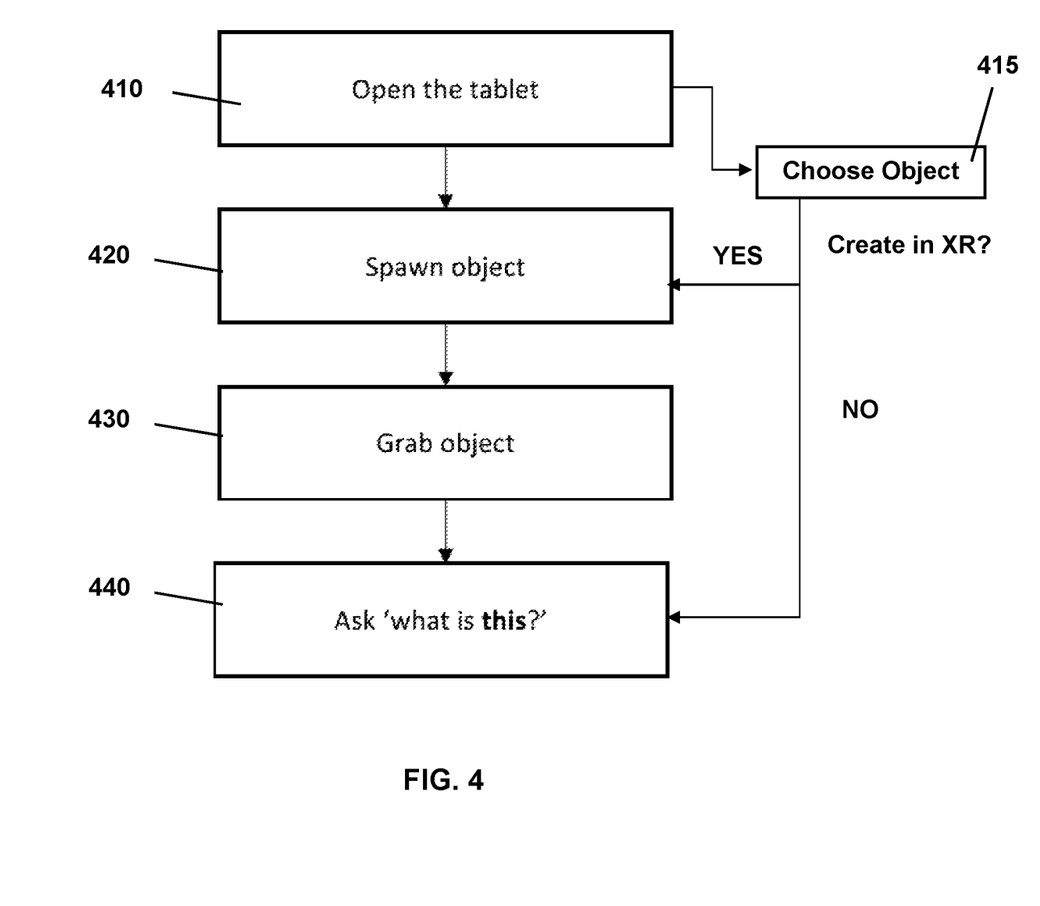
FIG. 4 is a flow diagram of a method of providing a virtual tablet input as an input of FIG. 3 in an embodiment of the invention.

FIG. 3 shows a diagram of a relational method 300 for using an AI process 190 based on numerous inputs 310 available to the XR system. With further reference to FIG. 4, one input 311 may be provided use a virtual tablet in the XR environment and choosing an object from the tablet for AI processing. FIG. 4 shows at step 410 that a user will open or activate the virtual tablet in the XR environment. At step 415, the user selects an object from the virtual tablet, such as touching, pointing (e.g. raycasting), selecting with a virtual pointer, eye tracking (e.g. raycasting) to the object on the virtual tablet, selecting from an interface, selecting a file with subject material, speech commands that say "what I'm looking at on the tablet," and like inputs to choose the object for input from the virtual tablet to the AI process. In some embodiments, choosing the object is sufficient input for the AI process submission and the tablet input 311 will proceed to step 440 where a user can ask "What is This?" or provide other control input that signifies that information is requested about the object submitted from the tablet to the XR system, including an AI process as applicable.

In embodiments where creation of the object from the virtual tablet and into the XR environment is desired, the choice of the object will proceed to step 420 for the XR system to spawn a virtual representation of the object. In some embodiments, a user could drag the object from the virtual tablet and into the 3D XR environment to spawn the object at step 420. After the object is spawned, at step 430 the XR system 200 enables the user to grab, touch, point at, look at and the like, the object to indicate that such virtual object is of interest for more information. The user can ask "What is This?" or provide other control input that signifies that information is requested about the object submitted from the tablet to the XR system 200, including an AI process as applicable.

In embodiments, objects spawned from a virtual tablet are resources that the XR system 200 already has information/metadata associated with such object. For example, if the XR system spawns a representation of Mercury (the planet, space object) then the XR system already has stored information about the virtual object Mercury being represented and it is a planet/space object. This information/metadata is sent along to the AI Process, such as ChatGPT™, so that AI Process understands that the user is referring to planet Mercury when the user has grabbed the virtual object and asks, 'what is this?'

Referring back to FIG. 3, in other embodiments, inputs 310 include (a) input 312 that includes emailing PDF to specific email address using an associated room number (such as a classroom, input 313 of Google™ drive integration/Dropbox™, (b) input 314 of cameras from headset, (c) input 314 of external camera such as phone camera, webcam, and the like, and (d) input 316 of a user manually entering text, such as by typing.

At step 320, inputs from inputs 312-316 are processed with text and OCR recognition of the XR system. In some embodiments, object to text conversion may also be implemented wherein the text corresponding to an object or image of object may be determined. At step 330, the text resulting from text, OCR and/or object to text conversion can optionally be shown in the XR environment by the XR system 200 as 3D text or 2D text on a virtual writing surface or information board (such as a virtual smartboard). The user can point to the displayed output 350 at step 360, or where applicable hold an object, and then activate a request for information such as speaking "What is this?" at step 360. At step 370, the XR system 200 interprets that input 310 from what the user is pointing at, holding, looking at or holding and sends a text request for information from an AI process, such as ChatGPT™/Wolfram Alpha™ plug-in.

In one aspect, an invention disclosed herein includes a method for assisting a user experiencing an extended reality environment with retrieving information comprising (i) displaying an assistive avatar in the extended reality environment to the user with a display of an extended reality hardware device being used by the user, such as an XR headset, wherein the assistive avatar is automatically controlled in real time by software communicating with the extended reality hardware device and the assistive avatar is not under real time control of a human, (ii) receiving an input from the user in the extended reality environment that provides an inquiry to the assistive avatar, (iii) retrieving a response to the inquiry; and (iv) providing the response to the inquiry via the assistive avatar as an answer to the inquiry, wherein said retrieving a response includes submitting a request for information based on the inquiry to an artificial intelligence process that transmits a reply to the response.

In a further aspect, the input includes the user holding, touching or pointing at a virtual object.

In a further aspect, the input includes the user touching or pointing at a virtual page that includes text.

In a further aspect, the input includes the user touching or pointing at a virtual tablet being displayed in the extended reality environment.

In a further aspect, the input includes a user speaking the inquiry to the assistive avatar.

In a further aspect, the input includes the user holding, touching, or pointing at a virtual object while the user is speaking the inquiry to the assistive avatar.

In a further aspect, the input includes the user speaking a pronoun to reference the specific subject of the inquiry without the user speaking specific identification of the virtual object.

In a further aspect, the input includes the user touching or pointing at a virtual page that includes text while the user is speaking the inquiry to the assistive avatar.

In a further aspect, the input includes the user speaking a pronoun to reference the specific subject of the inquiry without the user speaking specific identification of the text or page.

In a further aspect, the input includes the user touching or pointing at a screen of a virtual tablet being displayed in the extended reality environment while the user is speaking the inquiry to the assistive avatar.

In a further aspect, the input includes the user speaking a pronoun to reference the specific subject of the inquiry without the user speaking specific identification of an object or text shown on the screen of the virtual tablet.

In a further aspect, the input includes an image captured from the real world of the user with a camera.

In a further aspect, the method further comprises receiving the image from a camera of the extended reality hardware device.

In a further aspect, the method further comprises receiving the image from an external camera of a smartphone or webcam device.

In a further aspect, the extended reality hardware device with an integrated camera is worn by the user.

In a further aspect, the image is received by the extended reality hardware device while in a passthrough mode that allows the user to see objects in the user's real world.

In a further aspect, the extended reality hardware device receives the image while the camera is restricted from capturing surrounding real-world environment other than subject matter of the image permitted to be received into the extended reality environment.

In a further aspect, the input includes the user speaking a pronoun to reference the specific subject matter of the inquiry without the user speaking specific identification of the specific subject matter.

In a further aspect, the pronoun used to identify subject matter of an inquiry, such as an object, problem, image, page, educational material and the like, is the word "this."

In a further aspect, context of the user's inquiry, such as where, why and what activity is the user engaging in the XR environment, what virtual objects are present with the user in the XR environment, and the like, is evaluated to optimize the request for information based on the inquiry to the artificial intelligence process that transmits the reply to the response.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for assisting a user experiencing an extended reality environment comprising:
    displaying an assistive avatar in the extended reality environment to the user with a display of an extended reality hardware device being used by the user, wherein the assistive avatar is automatically controlled in real time by software communicating with the extended reality hardware device and the assistive avatar is not under real time control of a human;
    receiving an input from the user in the extended reality environment that provides an inquiry to the assistive avatar for additional information about either a virtual object or a real-world object that the user is holding, touching or pointing to in the extended reality environment, wherein the input further includes the user indicating the virtual object or the real-world object that the user is holding, touching or pointing to, and the additional information is not already present at such time and location in the extended reality environment when the user provides the inquiry to the assistive avatar;
    retrieving a response to the inquiry; and
    providing the response to the inquiry via the assistive avatar as an answer to the inquiry, wherein said retrieving a response includes submitting a request for information based on the inquiry being provided as text data to an artificial intelligence process that applies a large language model to the text data and then transmits the response that includes the additional information about the virtual object or real-world object.

2. The method of claim 1, wherein the input includes the user touching or pointing at a virtual page that includes text.

3. The method of claim 1, wherein the input includes the user touching or pointing at a virtual tablet being displayed in the extended reality environment.

4. The method of claim 1, wherein the input includes a user speaking the inquiry to the assistive avatar.

5. The method of claim 4, wherein the response that includes the additional information presents one or more of a picture, graphic, three-dimensional object display and video.

6. The method of claim 5, wherein the input includes the user speaking a pronoun to reference the virtual object or real-world object.

7. The method of claim 4, wherein the input includes the user touching or pointing at a virtual page that includes text while the user is speaking the inquiry to the assistive avatar.

8. The method of claim 7, wherein the input includes the user speaking a pronoun to reference the text or virtual page.

9. The method of claim 4, wherein the input includes the user touching or pointing at a screen of a virtual tablet being displayed in the extended reality environment while the user is speaking the inquiry to the assistive avatar.

10. The method of claim 9, wherein the input includes the user speaking a pronoun to reference an object or text shown on the screen of the virtual tablet.

11. The method of claim 4, wherein the input includes the user speaking a pronoun to reference the virtual object or real-world object.

12. The method of claim 11, wherein the pronoun is the word "this".

13. The method of claim 1, wherein the input includes an image captured from the real world of the user from a camera.

14. The method of claim 13, further comprising receiving the image from a camera of the extended reality hardware device.

15. The method of claim 14, further comprising receiving the image from an external camera of a smartphone or webcam device.

16. The method of claim 14, wherein the camera of the extended reality hardware device is worn by the user.

17. The method of claim 16, wherein the image is received by the extended reality hardware device while in a passthrough mode that allows the user to see objects in the user's real world.

18. The method of claim 17, further comprising the extended reality hardware device receiving the image while the camera is restricted from capturing surrounding real-world environment other than subject matter of the image permitted to be received into the extended reality environment.

19. The method of claim 1, further comprising evaluating context of the user's inquiry to optimize the request for information based on the inquiry to the artificial intelligence process that transmits the reply to the response.

20. The method of claim 1, wherein the response that includes the additional information presents one or more of a picture, graphic, three-dimensional object display and video.

* * * * *